(12) United States Patent
Xu et al.

(10) Patent No.: US 12,000,141 B2
(45) Date of Patent: Jun. 4, 2024

(54) SEMI-ACTIVE VIBRATION ABSORPTION AND ENERGY DISSIPATION CONTROL SYSTEM FOR RESTRAINING VORTEX-INDUCED VIBRATION OF BRIDGES

(71) Applicant: DALIAN UNIVERSITY OF TECHNOLOGY, Liaoning (CN)

(72) Inventors: Fuyou Xu, Liaoning (CN); Weizhi Zhu, Liaoning (CN); Bo Wang, Liaoning (CN); Wenjie Li, Liaoning (CN); Gao Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 217 days.

(21) Appl. No.: 17/777,862

(22) PCT Filed: Jun. 1, 2021

(86) PCT No.: PCT/CN2021/097560
§ 371 (c)(1),
(2) Date: May 18, 2022

(87) PCT Pub. No.: WO2022/252101
PCT Pub. Date: Dec. 8, 2022

(65) Prior Publication Data
US 2023/0078163 A1    Mar. 16, 2023

(51) Int. Cl.
*E04B 1/98* (2006.01)
*E01D 19/00* (2006.01)
*F16F 15/067* (2006.01)

(52) U.S. Cl.
CPC ............... *E04B 1/98* (2013.01); *E01D 19/00* (2013.01); *F16F 15/067* (2013.01)

(58) Field of Classification Search
CPC ......... E04B 1/98; E04H 9/0237; E04H 9/028; E04H 9/0235; E04H 9/023; E04H 9/0215;
(Continued)

(56) References Cited

U.S. PATENT DOCUMENTS 505,707 A * 9/1893 Green ................... E01D 15/005
                                                              14/58
506,571 A * 10/1893 Waddell .................. E01D 15/02
                                                              14/42
(Continued)

FOREIGN PATENT DOCUMENTS

CN    104562920 A    4/2015
CN    206376390 U    8/2017
(Continued)

*Primary Examiner* — Theodore V Adamos
(74) *Attorney, Agent, or Firm* — MUNCY, GEISSLER, OLDS & LOWE, P.C.

(57) ABSTRACT

The present invention provides a semi-active vibration absorption and energy dissipation control system for restraining vortex-induced vibration of bridges. It has the advantages and characteristics that: (1) springs are horizontally placed at the bottom of a beam, and lengths are not limited, so that the frequency requirement of a low-frequency target can be satisfied; (2) different target frequencies can be realized through different combinations of a plurality of springs connected in series and in parallel, so that multi-order vortex-induced vibration control needs are satisfied; (3) the springs made of fiber reinforced nylon materials are adopted, and are notched, so that a frequency implementation range can be greatly widened; (4) the material and the form of a mass body are not limited, and a water bag can be used, which has low cost and is convenient for disassembly, assembly and mass adjustment.

10 Claims, 1 Drawing Sheet

(58) Field of Classification Search
CPC ......... E04H 9/021; E04H 9/022; E01D 19/00; F16F 15/067
See application file for complete search history.

(56) References Cited

U.S. PATENT DOCUMENTS

| | | | | |
|---|---|---|---|---|
| 3,466,686 | A * | 9/1969 | Allen | F15B 11/22 14/42 |
| 5,025,600 | A * | 6/1991 | Sugimoto | E04B 1/98 248/588 |
| 5,185,976 | A * | 2/1993 | Miyake | F16F 13/007 52/167.6 |
| 5,553,342 | A * | 9/1996 | Townsend | E04H 9/021 14/13 |
| 5,713,162 | A * | 2/1998 | Gallo | E01D 19/02 52/167.6 |
| 5,799,456 | A * | 9/1998 | Shreiner | E04B 1/6803 52/573.1 |
| 9,580,924 | B1 * | 2/2017 | Taylor | E04H 9/028 |
| 11,441,311 | B1 * | 9/2022 | Gant | E04B 1/98 |
| 11,509,126 | B2 * | 11/2022 | Seyama | H02G 11/003 |
| 2005/0138870 | A1 * | 6/2005 | Ishimura | E04H 9/0235 52/167.1 |
| 2007/0067929 | A1 * | 3/2007 | Ptak | E01D 19/00 14/73.5 |
| 2008/0190217 | A1 * | 8/2008 | Laurent | G01N 3/08 73/862.451 |
| 2013/0118098 | A1 * | 5/2013 | Constantinou | E04H 9/0235 52/741.3 |
| 2015/0191928 | A1 * | 7/2015 | Germain | E04B 1/0007 52/167.7 |
| 2015/0361657 | A1 * | 12/2015 | Hejazi | E04H 9/0237 52/167.2 |

FOREIGN PATENT DOCUMENTS

| | | | | |
|---|---|---|---|---|
| CN | 108589511 | A | | 9/2018 |
| CN | 112301873 | A | | 2/2021 |
| CN | 112575672 | A | | 3/2021 |
| CN | 112853927 | A | | 5/2021 |
| DE | 4105664 | C1 * | 8/1992 | |
| DE | 102021004341 | A1 * | 3/2023 | ............. E01D 11/02 |
| JP | H07207621 | A | | 8/1995 |
| JP | 2011117585 | A | | 6/2011 |
| KR | 20110048404 | A * | 5/2011 | |
| KR | 20180096851 | A * | 8/2018 | |
| WO | WO-2005116481 | A1 * | 12/2005 | ............. E01D 19/00 |

* cited by examiner

SEMI-ACTIVE VIBRATION ABSORPTION AND ENERGY DISSIPATION CONTROL SYSTEM FOR RESTRAINING VORTEX-INDUCED VIBRATION OF BRIDGES

TECHNICAL FIELD

The present invention belongs to the technical field of wind-induced vibration control of bridges, which relates to a semi-active vibration absorption and energy dissipation control system for restraining vortex-induced vibration of bridges.

BACKGROUND

Vortex-induced vibration (abbreviated as VIV) of long-span bridges often occurs, which has adverse effects on bridge structures and drivers and passengers on the bridges and even causes social panic. Therefore, it is necessary to prevent and control vortex-induced vibration. The long-span bridges generally generate vertical bending vortex-induced vibration and rarely generate torsional vortex-induced vibration. Moreover, even if the torsional vortex-induced vibration occurs, the amplitude is generally small, and the problem is not serious. A tuned mass damper can be used for controlling bridge vibration. However, the frequency of the vertical bending vortex-induced vibration of the bridge is low (<0.2 Hz. or even lower than 0.1 Hz). Therefore, the tuned mass damper requires a spring to be stretched or compressed by the length of several meters or even tens of meters. The lower the frequency is, the smaller the stiffness of the corresponding system is and the longer the spring is (has a square relationship with the vibration cycle). The larger the mass is, the higher the cost is. On the one hand, it is difficult to directly install the tuned mass damper inside the main beam. On the other hand, the traditional metal spring is used, which has a very large mass of tens of tons or larger, so that the applicability is greatly reduced. Therefore, at present, the existing traditional tuned mass damper is generally only used on occasions when the vibration frequency is higher than 0.2 Hz. To sum up, it is necessary to propose more advanced, more applicable, and more economical vortex-induced vibration control mechanical measures through in-depth research.

SUMMARY

The present invention proposes a semi-active vibration absorption and energy dissipation control system for restraining vortex-induced vibration of bridges. Aiming at the characteristics of low vertical vortex-induced vibration frequency, possible multi-order vortex-induced vibration, and wide frequency band of long-span bridges, the traditional tuned mass damper is improved in many aspects, which is more convenient, economical, efficient, and practical. The specific contents, advantages, and features of the present invention are as follows: the spring is changed from vertical hanging inside the box beam to horizontal placement at the bottom of the main beam, so the spring is no longer limited by space, the spring length is arbitrary, and any vibration frequency can be realized. The horizontally placed spring can be divided into multiple segments, and different lengths are selected to achieve different system target stiffness, so that the vibration frequency can be adjusted in a wide range, which can be conveniently applied to the control of multi-order vortex-induced vibration. In order to achieve lower vibration frequency, fiber reinforced nylon materials with lower stiffness and density than steel are selected, which can greatly reduce the engineering cost. The spring material can also be opened and notched to further reduce the stiffness of the spring, shorten the length of the spring and reduce the engineering cost. The material and the form of the mass body of the vibration control system are unlimited. Steel plates, steel blocks, concrete blocks, and water bags can be used. The disassembly, assembly, and parameter adjustment are convenient. Relative to the traditional TMD with the same tonnage, the cost can be reduced by one order of magnitude or even two orders of magnitude. By using two coaxial pulleys with different diameters, the vibration of the mass body can be amplified so that the weight of the mass body can be significantly reduced under the condition of constant control efficiency, or the control efficiency can be significantly increased under the condition of the constant weight of the mass body. The cost is further reduced, and the advantages and competitiveness are further improved, especially in the case of high frequency. The vibration control device has a small volume and is installed at the bottom of the beam. When the vibration control device does not work, the device can be temporarily folded, and the appearance of the bridge is not influenced basically. The vibration of the mass body is convenient to control, and damping parameters can be adjusted. Super-damping can be achieved when the mass body reaches a specified large amplitude through human intervention to improve the control efficiency. The system is not only limited to controlling vortex-induced vibration of the bridge but also can suppress the flutter of some bridges. By adjusting the stiffness, mass, and damping parameters of the system, energy dissipation capacity can be improved and can be used for flutter control.

The technical solution of the present invention is as follows:

A semi-active vibration absorption and energy dissipation control system for restraining vortex-induced vibration of bridges comprises a spring end plate 1 fixed on a bottom plate of the main beam, a linear tensile spring 2, a vertical suspension rope 3, a slider 4, a slideway 5, a first high-strength rope 6, a first pulley 7, a second pulley 8, a second high-strength rope 9, a mass body 10, a pulley fixing device 11, an energy dissipation device 12, an electric control jack 13 and a controller 14. The spring end plate 1 is fixed on the bottom plate of the main beam and used to fix one or a plurality of horizontally arranged linear tensile springs 2 connected in series or in parallel. When the low-frequency vortex-induced vibration is controlled, the original length and tensile length of the linear tensile spring 2 are generally long, reaching several meters or even tens of meters, so large deflection will be generated under the action of self-weight. At this time, a plurality of vertical suspension ropes 3 can be arranged at intervals to provide vertical suspension points for the linear tensile spring 2. The upper end of the vertical suspension rope 3 and the slider 4 are connected: the slider 4 is embedded in the slideway 5 fixed on the bottom plate of the main beam: and in the horizontal expansion and contraction process of the linear tensile spring 2, the vertical suspension rope 3 and the slider 4 slide in the slideway 5 and basically provide no horizontal force. The slideway 5 can be continuous or segmented as long as the sliding stroke of the slider 4 is satisfied. One end of the first high-strength rope 6 is connected with the end of the linear tensile spring 2, and the other end is fixed and wound on the first pulley 7, and the winding length is ensured to be enough to satisfy the expansion and contraction needs of the linear tensile spring 2. The first pulley 7 is coaxially fixed with the second pulley 8 with a larger diameter: the upper end of the second high-strength rope 9 is fixed and wound on the second pulley 8, and the winding length is ensured to be enough: and the lower end of the second high-strength rope 9 is connected with the mass body 10; the first pulley 7 and the second pulley 8 are supported below the main beam by the fixing device 11; and the parameters of the rigidity of the linear tensile spring 2, the diameters of the first pulley 7 and the second pulley 8, and the mass of the mass body 10 are designed so that the vibration frequency of the vibration control system is basically consistent with the controlled vortex-induced vibration frequency of the bridge. When the vertical or torsional vortex-induced vibration occurs in the bridge, the mass body 10 may generate large resonance, which absorbs the vibration energy of the bridge and plays a role in restraining the vibration of the bridge. If the damping of the vibration control system is low, the energy consumption is less, and the mechanical energy (kinetic energy and potential energy) of the mass body 10 with large vibration needs to be consumed. This patent uses the energy dissipation device 12 to achieve this objective. The energy dissipation device 12 is connected with the electric control jack 13, and controlled by movement and states. The controller 14 is used to control the electric control jack 13 so as to drive the energy dissipation device 12. When the speed of the mass body 10 is basically close to zero, the second pulley 8 is clamped and then relaxed. The kinetic energy and the potential energy of the mass body 10 can be rapidly consumed by friction. Energy consumption can also be generated through the friction between energy dissipation device 12 and the second pulley 8 in the vibration process of the mass body 10, or through the friction by automobile hub braking. The specific way is not limited. Relevant parameters can be determined by optimization design to achieve the optimal control effect.

The spring end plate 1 is made of a steel plate with a stiffener to ensure sufficient stiffness and strength and can be welded at the appropriate position of the bottom plate of the main beam. When the bridge span is small or high-order modal vibration needs to be controlled, the spring end plate can also be fixed on a pier (a tower or an abutment), which is related to the original length of the linear tensile spring 2, tensile length, the position of the pulley fixing device 11 and other parameters.

The linear tensile spring 2 has good linear elasticity and ultimate tensile length, and the model, stiffness, and length need to be related to the vortex-induced vibration frequency of the bridge, the diameter ratio of the first pulley 7 and the second pulley 8, the mass of the mass body 10, and other parameters. The mass of the linear tensile spring 2 is as small as possible, which can not only reduce the material cost and construction cost but also can reduce the sag effect. The linear tensile spring 2 can be either a full-length spring or connected in series in segments and does not necessarily adopt the same specification. Multi-segment series springs with different lengths can be used to achieve different tensile stiffness, to adjust the vibration frequency. A plurality of springs can also be connected in parallel according to the strength and stiffness requirements.

The linear tensile spring 2 is not limited to metal springs of steel, aluminum alloy, and titanium alloy: For low-frequency vibration control, the spring length needs to be very long. At this time, the metal spring may not be applicable, and the fiber reinforced nylon materials with smaller stiffness and density are needed. These materials need to satisfy the characteristics of high strength, low elastic modulus, good linear elasticity, low density, and low unit price.

The linear tensile spring 2 is not limited to adopting a circular solid section, and can also use appropriate opening and notching forms as required to further reduce the tensile stiffness, so as to shorten the original length of the spring to achieve the purpose of reducing the project cost.

The vertical suspension rope 3 of the spring is light and has high strength and small tensile deformation. A plurality of vertical suspension ropes 3 are generally arranged at different positions of the linear tensile spring 2. The main purpose is to reduce the sag effect of the linear tensile spring 2 to reduce the nonlinear effect and ensure the vibration control efficiency.

The slider 4 slides freely in the slideway 5, and the friction coefficient is as small as possible.

To reduce or eliminate the sag effect and the nonlinear effect of the linear tensile spring 2, it is not necessary to adopt the mode of the vertical suspension ropes 3, the slider 4, and the slideway 5. Many modes can be adopted. For example, the linear tensile spring 2 is placed in a horizontally placed pipeline, groove, or even on a flat plate, or sleeved on a horizontally placed pipe rod, etc. The disadvantage is mutual friction, which affects the performance of the spring, and some parameters are not convenient for accurate control.

The first pulley 7 and the second pulley 8 have sufficient strength and stiffness, and the diameter ratio is unlimited, which can be designed and selected according to needs. For low-frequency vibration (such as lower than 0.15 Hz), the second pulley 8 is not required. For higher vibration frequency: the larger the diameter ratio of the second pulley 8 to the first pulley 7 is, the better the overall performance is.

The length, the strength and the stiffness of the first high-strength rope 6 and the second high-strength rope 9 are sufficient, and the diameter is as small as possible to ensure that a part is always wound on the first pulley 7 and the second pulley 8 respectively in the vibration process.

The shape and the material of the mass body 10 are not limited. Steel plates, steel blocks, lead blocks, concrete blocks, or water bags can be used. The water bag is recommended in the present invention for the following reasons: convenient disassembly and assembly, low cost, convenient self-weight adjustment (a water inlet and a water outlet are arranged at the upper part and the bottom, respectively), and low-risk coefficient. In a non-working state, the water bag is stored after the water is released, which does not affect the appearance of the bridge basically.

The energy dissipation device 12 is made of materials with a large friction coefficient and good friction resistance. When the mass body 10 vibrates up and down and the second pulley 8 rotates, the energy dissipation device 12 can also come into contact with the mass body 10 and the second pulley 8 and consume energy by friction. The energy dissipation device 12 can also be used to clamp the second pulley 8 only when the mass body 10 reaches a designated amplitude (preferably when the speed is close to 0), and then the second pulley is slowly relaxed. The kinetic energy and the potential energy of the vibration system are consumed by mutual friction.

The electric control jack 13 has sufficient power and output accuracy.

The controller 14 has high control accuracy.

The semi-active vibration absorption and energy dissipation control system can quickly absorb vibration through the mass body 10, and consume the mechanical energy of the mass body 10 in time through the energy dissipation device 12, so as to enter a next vibration cycle, quickly absorb the mechanical energy of the bridge and restrain the vibration of the bridge.

For the control of torsional vortex-induced vibration of the bridge, the device is arranged on the upstream and downstream sides of the main beam of the bridge, and the horizontal linear tensile spring 2 can also be arranged transversely along the main beam. Because the torsional vibration frequency is relatively high (>0.2 Hz), the transverse width of the bridge can generally meet the requirements.

If the mass of the mass body 10 and the diameter ratio of the second pulley 8 to the first pulley 7 are large enough, the vibration absorption capacity of the mass body 10 will be large enough, and eventually sufficiently strong energy dissipation capacity can be provided to control the flutter of the bridge.

Two sets of the above devices can be arranged. On the one hand, the weight of a single set of mass body 10 can be reduced, and the specification of the linear tensile spring 2 is adjusted accordingly. On the other hand, the horizontal tension of a single spring end plate 1 can be reduced. The horizontal force of the pulley fixing device 11 can also be offset and the local stress of the main beam can be improved.

For the working condition of high-frequency (such as >0.25 Hz) vibration control, the tensile length and the original length of the spring can be controlled within 10 m. Two sets of the devices can be made symmetrically left and right, and installed symmetrically in a frame that can bear sufficient horizontal pressure. The frame is fixed at the bottom of the main beam. Thus, the main beam only endures the vertical load without horizontal load, which is more conducive to the stress of the structure and easy to be accepted.

The present invention has the following beneficial effects: (1) the spring is placed horizontally instead of vertically and thus is not limited to the internal space of the main beam. The spring can be applied to any frequency and has a wider range of applications. (2) The spring can be divided into multiple segments, so the vibration frequency of the system can be adjusted in a wide range. (3) The spring is not limited to the traditional metal spring. Through the use of the fiber reinforced nylon materials and appropriate opening and notching treatment, the mass and the cost of the spring under low-frequency vibration conditions can be greatly reduced. (4) The material and the form of the mass body are not limited, and the water bag can be used, which has low cost and is convenient for disassembly: assembly, and adjustment. (5) By using the coaxial pulleys with different diameters, the weight of the mass body can be significantly reduced under the condition of constant control efficiency, or the control efficiency can be significantly increased under the condition of the constant weight of the mass body, which is more economical for high-frequency conditions. (6) The device has a small volume and is installed at the bottom of the beam, which does not affect the appearance basically. Two or more sets can be made to improve the stress and reduce the cost. (7) The vibration control of the mass body is convenient, and the mechanical energy can be quickly consumed by human intervention to improve the control efficiency of the vibration of the bridge. (8) The vortex-induced vibration (vertical bending and torsion) of the bridge can be controlled, and the flutter of some bridges can also be restrained.

Figure 1:
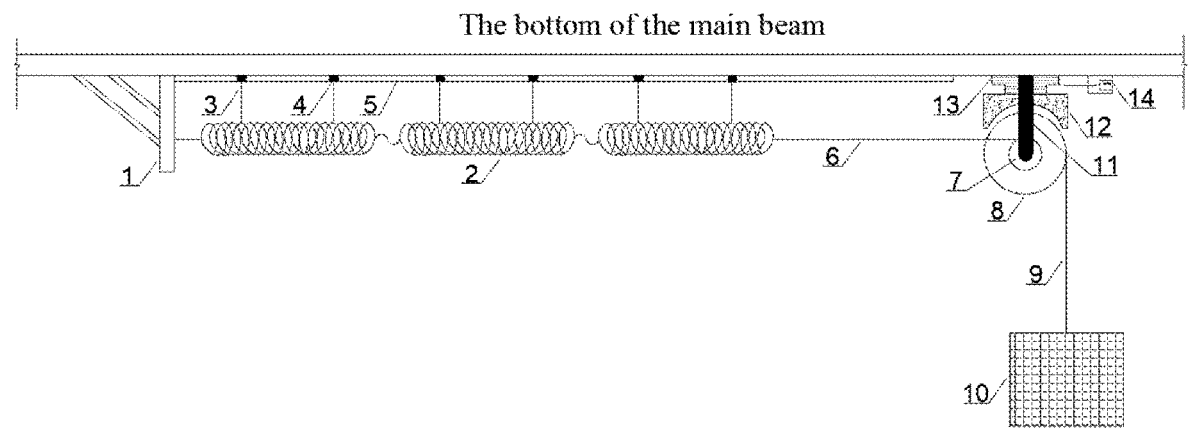
FIG. 1 is a structural diagram of a semi-active vibration absorption and energy dissipation control system for restraining vortex-induced vibration of long-span bridges.
Figure 2:
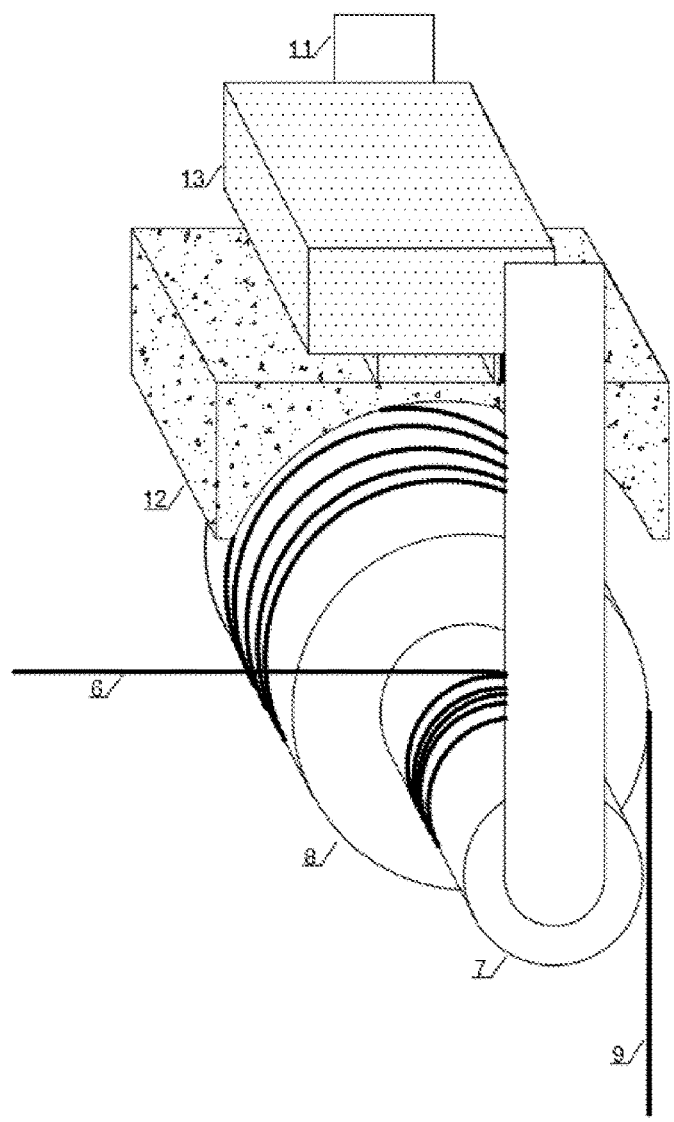
FIG. 2 is a locally enlarged view of an energy dissipation device of a pulley in FIG. 1.

In the drawings: 1 spring end plate; 2 linear tensile spring; 3 vertical suspension rope; 4 slider; 5 slideway; 6 first high-strength rope; 7 first pulley; 8 second pulley; 9 second high-strength rope; 10 mass body; 11 pulley fixing device; 12 energy dissipation device; 13 electric control jack; 14 controller.

DETAILED DESCRIPTION

Specific embodiments of the present invention are described below in detail in combination with the technical solution and accompanying drawings, but the implementation of the present invention is not limited to this.

As shown in FIG. 1, a semi-active vibration absorption and energy dissipation control system for restraining vortex-induced vibration of long-span bridges comprises a spring end plate 1 fixed on a bottom plate of the main beam, a linear tensile spring 2, a vertical suspension rope 3, a slider 4, a slideway 5, a first high-strength rope 6, a first pulley 7, a second pulley 8, a second high-strength rope 9, a mass body 10, a pulley fixing device 11, an energy dissipation device 12, an electric control jack 13 and a controller 14. The spring end plate 1 is generally arranged on the bottom of the main beam or a pier (tower and abutment), can be made of stiffener steel plates and is used to fix one or a plurality of horizontally arranged linear tensile springs 2 connected in series or in parallel. The original length and tensile length of the linear tensile spring 2 are generally long. A plurality of vertical suspension ropes 3 can be arranged at intervals to provide vertical suspension points to reduce the nonlinear effect caused by the sag. The upper end of the vertical suspension rope 3 and the slider 4 are connected: the slider 4 is embedded in the slideway 5 fixed on the bottom plate of the main beam: One end of the first high-strength rope 6 is connected with the end of the linear tensile spring 2, and the other end is fixed and wound on the first pulley 7: and the winding length is ensured to be enough to satisfy the expansion and contraction needs of the linear tensile spring 2. The first pulley 7 is coaxially fixed with the second pulley 8 with a larger diameter: the upper end of the second high-strength rope 9 is fixed and wound on the second pulley 8, and the winding length is ensured to be enough: and the lower end of the second high-strength rope 9 is connected with the mass body 10: the first pulley 7 and the second pulley 8 are supported below the main beam by the fixing device 11: The energy dissipation device 12 is connected with the electric control jack 13, and controlled by movement and states. The controller 14 is used to control the electric control jack 13 so as to drive the energy dissipation device 12. When the speed of the mass body 10 is basically close to zero, the second pulley 8 is clamped and then relaxed. The kinetic energy and the potential energy of the mass body 10 can be rapidly consumed by friction. Energy consumption can also be generated through the friction between energy dissipation device 12 and the second pulley 8 in the vibration process of the mass body 10. The stiffness of the linear tensile spring 2, the mass of the mass body 10 and the diameter ratio of the first pulley 7 and the second pulley 8 are set according to the vibration frequency of the bridge to make the vibration frequency of the control system close to the vibration frequency of the bridge: the principle of resonance energy absorption is used to transfer the vibration energy of the bridge to the semi-active vibration absorption and energy dissipation control system, and the friction between the energy dissipation device 12 and the second pulley 8 is used to dissipate the total energy of the semi-active vibration absorption and energy dissipation control system to suppress the vibration of the bridge. If two sets of the devices are arranged symmetrically left and right, the weight of a single set of mass body 10 can be reduced, and the specification of the linear tensile spring 2 is adjusted accordingly. The horizontal tension of a single spring end plate 1 can also be reduced. The horizontal force of the pulley fixing device 11 can also be offset and the local stress of the main beam can be improved. For the working condition of high frequency, when the tensile length of the spring is short, two sets of the devices can be made symmetrically left and right, and installed symmetrically in a frame fixed at the bottom of the main beam, thereby improving the structural stress.

The semi-active vibration absorption and energy dissipation control system for restraining vortex-induced vibration of bridges provided by the present invention can conveniently adjust the system parameters to realize the control requirements of multi-order vertical bending vortex-induced vibration. The reasonably arranged semi-active vibration absorption and energy dissipation control system can also control the torsional vortex-induced vibration of the bridges, restrain the flutter of some bridges, increase the critical wind speed of flutter and reduce the amplitude. Through the appropriate transformation of the device, the control system can also be applied to vortex-induced vibration, flutter, and galloping control of other structures, and has wide application scope, convenience, rapidness, safety and, practicality.

The above only describes preferred embodiments of the present invention and is not intended to limit the present invention in any form. Any equivalent change, modification, or evolution made to the above embodiments by those skilled in the art through the technical solutions of the present invention shall still belong to the scope of the technical solutions of the present invention.

The invention claimed is:

1. A semi-active vibration absorption and energy dissipation control system for restraining vortex-induced vibration of bridges, comprising a spring end plate fixed on a bottom plate of a main beam, a linear tensile spring, a plurality of vertical suspension ropes, a plurality of sliders, a slideway, a first high-strength rope, a first pulley, a second pulley, a second high-strength rope, a mass body, a pulley fixing device, an energy dissipation device, an electric control jack and a controller, wherein the spring end plate is fixed on the bottom plate of the main beam and used to fix a starting end of the linear tensile spring so that the linear tensile spring is arranged horizontally; the plurality of vertical suspension ropes and the plurality of sliders are connected and arranged at intervals to provide vertical suspension points for the linear tensile spring; the sliders are embedded in the slideway fixed on the bottom plate of the main beam; one end of the first high-strength rope is connected with a second end of the linear tensile spring, and the other end of the first high-strength rope is fixed and wound on the first pulley; the first pulley is coaxially fixed with the second pulley, and the diameter of the second pulley is larger than the diameter of the first pulley; an upper end of the second high-strength rope is fixed and wound on the second pulley, and a lower end of the second high-strength rope is connected with the mass body; the first pulley and the second pulley are supported below the bottom plate of the main beam by the pulley fixing device; the energy dissipation device is connected with the electric control jack which is fixed below the bottom plate of the main beam; the controller is used to control the electric control jack so as to drive the energy dissipation device; the mass of the linear tensile spring, the stiffness of the linear tensile spring, the mass of the mass body and the diameter ratio of the first pulley and the second pulley are adjusted to make a vibration frequency of the semi-active vibration absorption and energy dissipation control system close to a vibration frequency of a bridge; the principle of resonance energy absorption is used to transfer a vibration energy of the bridge to the semi-active vibration absorption and energy dissipation control system, and friction between the energy dissipation device and the second pulley is used to dissipate a total energy of the semi-active vibration absorption and energy dissipation control system to suppress the vibration energy of the bridge.

2. The semi-active vibration absorption and energy dissipation control system for restraining vortex-induced vibration of bridges according to claim 1, wherein a sag effect and nonlinear effect of the linear tensile spring are reduced or eliminated by using the vertical suspension ropes, the sliders and the slideway, and the linear tensile spring is placed in a horizontally placed pipeline, groove or plate or sleeved on a horizontally placed pipe rod for replacement.

3. The semi-active vibration absorption and energy dissipation control system for restraining vortex-induced vibration of bridges according to claim 1, wherein the linear tensile spring is horizontally placed on the bottom plate of the main beam; the linear tensile spring is made of fiber reinforced nylon material and is opened or grooved, to reduce the amount of the material.

4. The semi-active vibration absorption and energy dissipation control system for restraining vortex-induced vibration of bridges according to claim 3, wherein two sets of the semi-active vibration absorption and energy dissipation control system of claim 3 are symmetrically arranged to reduce a weight compared of a single set of the semi-active vibration absorption and energy dissipation control system of claim 3, eliminate a horizontal force of the spring end plate and the pulley fixing device, and improve a stress of the bridge.

5. The semi-active vibration absorption and energy dissipation control system for restraining vortex-induced vibration of bridges according to claim 3, wherein the linear tensile spring is a full-length spring, or arranged in sections in series or in parallel.

6. The semi-active vibration absorption and energy dissipation control system for restraining vortex-induced vibration of bridges according to claim 1, wherein two sets of the semi-active vibration absorption and energy dissipation control system of claim 1 are symmetrically arranged to reduce a weight compared to a single set of the semi-active vibration absorption and energy dissipation control system of claim 1, eliminate a horizontal force of the spring end plate and the pulley fixing device, and improve a stress of the bridge.

7. The semi-active vibration absorption and energy dissipation control system for restraining vortex-induced vibration of bridges according to claim 6, wherein the linear tensile spring is a full-length spring, or arranged in sections in series or in parallel.

8. The semi-active vibration absorption and energy dissipation control system for restraining vortex-induced vibration of bridges according to claim 1, wherein the linear tensile spring is a full-length spring, or arranged in sections in series or in parallel.

9. The semi-active vibration absorption and energy dissipation control system for restraining vortex-induced vibration of bridges according to claim 8, wherein the mass body is a steel plate, a steel block, a lead block, a concrete block or a water bag.

10. The semi-active vibration absorption and energy dissipation control system for restraining vortex-induced vibration of bridges according to claim 1, wherein the mass body is a steel plate, a steel block, a lead block, a concrete block or a water bag.

* * * * *